(12) United States Patent
Wang

(10) Patent No.: US 12,004,277 B2
(45) Date of Patent: **\*Jun. 4, 2024**

(54) CONSTANT POWER SUPPLY FOR LED EMERGENCY LIGHTING USING SMART OUTPUT RESETTING CIRCUIT FOR NO LOAD CONDITIONS

(71) Applicant: ABL IP HOLDING LLC, Atlanta, GA (US)

(72) Inventor: Jie Wang, Tucson, AZ (US)

(73) Assignee: ABL IP HOLDINGS LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,655

(22) Filed: Apr. 29, 2022

(65) Prior Publication Data

US 2022/0338322 A1 Oct. 20, 2022

Related U.S. Application Data

(63) Continuation of application No. 16/267,112, filed on Feb. 4, 2019, now Pat. No. 11,324,091, which is a continuation of application No. 15/213,155, filed on Jul. 18, 2016, now Pat. No. 10,201,050, which is a continuation of application No. 13/866,951, filed on Apr. 19, 2013, now Pat. No. 9,398,649.

(51) Int. Cl.
| | |
|---|---|
| H05B 45/385 | (2020.01) |
| H02J 7/00 | (2006.01) |
| H05B 44/00 | (2022.01) |
| H05B 45/00 | (2022.01) |

(52) U.S. Cl.
CPC ............ *H05B 45/385* (2020.01); *H02J 7/00* (2013.01); *H02J 7/0068* (2013.01); *H02J 7/007* (2013.01); *H05B 44/00* (2022.01); *H05B 45/00* (2020.01)

(58) Field of Classification Search
CPC .............. H05B 33/08; H05B 33/0842; H05B 33/0887; H05B 33/0809; H05B 33/0803; H05B 33/0815; H05B 45/385; H05B 44/00; H05B 45/00; H02J 7/00; H02J 7/0068; H02J 7/007; Y10T 307/625
USPC ........................................................ 307/66
See application file for complete search history.

(56) References Cited

U.S. PATENT DOCUMENTS

| | | | | |
|---|---|---|---|---|
| 10,201,050 | B2 * | 2/2019 | Wang | H02J 7/00 |
| 11,324,091 | B2 * | 5/2022 | Wang | H02J 7/00 |
| 2013/0188407 | A1 * | 7/2013 | Uguen | H02M 7/04 |
| | | | | 363/126 |
| 2014/0055055 | A1 * | 2/2014 | Melanson | H05B 45/385 |
| | | | | 363/20 |

\* cited by examiner

*Primary Examiner* — Danny Nguyen
(74) *Attorney, Agent, or Firm* — Quarles & Brady LLP; Michael J. Curley

(57) ABSTRACT

A constant power backup power supply for LED lighting fixtures is disclosed. The power supply includes a storage battery that is charged while an AC power source is in an ON condition. When AC power transitions to an OFF condition, a capacitor bank charged by the battery supplies current to the primary side of a flyback converter operating in discontinuous conduction mode. The secondary side of the flyback converter supplies constant output power to the LED lighting fixture for an arbitrary output voltage within a predetermined range.

18 Claims, 1 Drawing Sheet

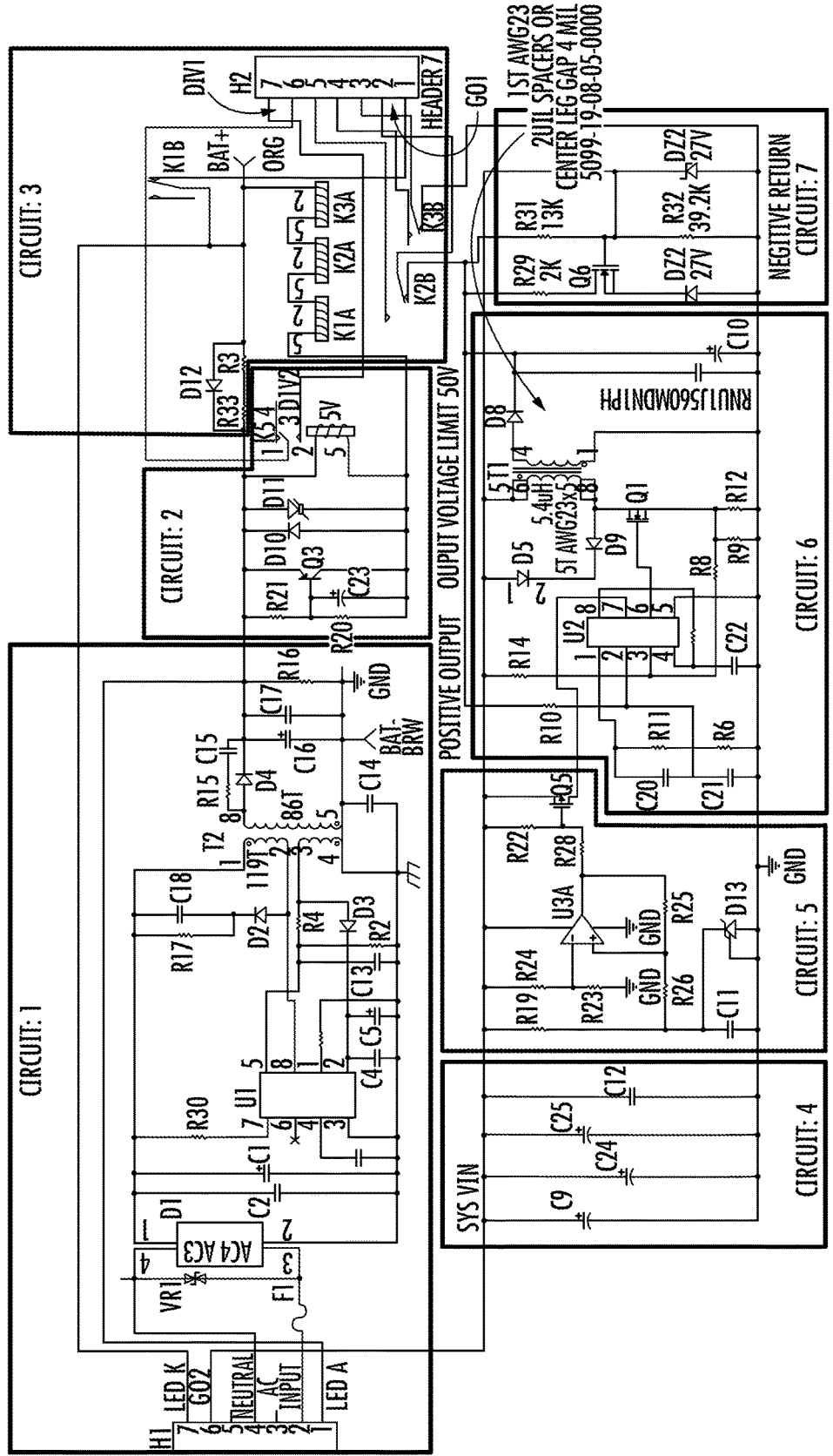

CONSTANT POWER SUPPLY FOR LED EMERGENCY LIGHTING USING SMART OUTPUT RESETTING CIRCUIT FOR NO LOAD CONDITIONS

CROSS-REFERENCE TO RELATED APPLICATIONS

This application is a continuation of U.S. application Ser. No. 16/267,112, filed Feb. 4, 2019, issuing as U.S. Pat. No. 11,324,091 on May 3, 2022, which is a continuation of U.S. patent application Ser. No. 15/213,155, filed Jul. 18, 2016, which is a continuation of U.S. patent application Ser. No. 13/866,951, filed Apr. 19, 2013, which issued as U.S. Pat. No. 9,398,649 on Jul. 19, 2016, the disclosures of which are incorporated by reference herein in their entirety.

TECHNICAL FIELD

The invention relates to emergency backup power supplies for LED illumination. In particular, the invention relates to an emergency battery backup system for driving LED illumination fixtures on a constant power basis, enabling the support of LED illumination fixtures having arbitrary voltage drops.

BACKGROUND OF THE INVENTION

Illumination based on light emitting diodes ("LEDs") has a variety of advantages over conventional incandescent and fluorescent illumination, for both commercial and residential settings. LED lighting is inherently much more efficient than incandescent illumination since virtually all of the optical power emitted by LED emitters is distributed in the visible spectrum. While fluorescent bulbs (including compact fluorescent or "CFL" bulbs) are comparatively more efficient than incandescent bulbs, the spectrum of light emitted by fluorescent sources is still viewed as unpleasant as it fails to mimic the spectrum of sunlight. Additionally, fluorescent light sources (like incandescent sources) are fragile, requiring glass envelopes to maintain a vacuum and/or to contain the discharge gas. In the case of CFL bulbs, these bulbs contain trace amounts of mercury, which can be released when the bulbs break. Additionally, fluorescent lights take more time to fully illuminate.

LED lighting has the potential to overcome all of these disadvantages with conventional lighting sources. As is set forth above, LEDs are inherently efficient. Additionally, "white" LEDs, which are constructed by providing a short wavelength LED source which excites a phosphor emitter, can be "tuned" and then filtered to achieve a variety of pleasing color temperatures. LEDs are mechanically sturdy. Additionally, LEDs can be driven in DC mode, eliminating flicker.

Given the advantages of LED illumination, LED illumination fixtures are increasingly being used in commercial and/or industrial environments. As a result of various statutory and practical safety requirements, lighting fixtures used in commercial and industrial settings generally must be equipped with a backup system to provide a minimum level of illumination in the event of a power failure. Conventional battery backup systems for driving fluorescent illumination fixtures are unsuitable for use with LED fixtures, which have vastly different current, voltage and drive characteristics.

Conventionally available LED lighting fixtures are provided as series combinations of LEDs, typically driven in DC. LEDs have I-V characteristics that are similar to other semiconductor diodes, which is to say, that current varies exponentially as a function of forward voltage. The "white" LEDs used in commercial lighting applications typically drop 3.3 to 4.5V at their ideal operating forward current. Commercially available DC LED lighting fixtures are available in 12 VDC, 20 VDC and 30 VDC, representing different numbers of series connected LEDs. Conventional emergency backup drivers for DC LED lighting fixtures are provided as constant current devices, for example, by varying load power. However, because DC LED lighting fixtures require a variety of different operating voltages, a variety of conventional emergency backup drivers are required to supply the necessary current at the voltage required by the specific lighting fixture to be driven. It would be desirable to provide an emergency backup LED driver capable of supplying backup power to LED lighting fixtures regardless of forward voltage.

SUMMARY OF THE INVENTION

Embodiments of the invention include a constant power battery backup system for driving LED illumination fixtures in DC. Embodiments of the invention ensure constant power delivery to LED fixtures having arbitrary voltage requirements by using a discontinuous conducting mode (DCM) flyback converter. Systems according to the present invention are capable of supplying backup battery power on a constant power basis at the high DC currents required by commercial LED lighting fixtures, i.e., 100-1000 mA.

Other aspects of the invention include a DCM flyback converter operating in conjunction with a low battery sense circuit, which protects a backup battery source from over depletion during operation of the LED backup lighting system according to the invention.

Other aspects of the invention include a no load resetting circuit, which regulates the output voltage of the system of the invention when the LED load to be driven is disconnected from backup driver. Additionally, the no load resetting circuit according to the aforementioned aspect of the invention limits LED inrush current to prevent damaging the LED load at low voltages.

In a first embodiment, a backup power supply for driving an LED light source is provided. The supply includes a storage battery adapted to provide DC electrical current and a constant power LED driver circuit having a flyback converter having a transformer operating in discontinuous conduction mode. The flyback converter has a primary inductor winding that is electrically coupled to the storage battery, and a secondary inductor winding that is selectably electrically coupled to the LED light source.

In another embodiment, the backup power supply has a capacitor bank electrically interposed between the primary inductor winding and the storage battery. The capacitor bank has a combined capacitance sufficient to supply sufficient current to the primary inductor winding to supply constant power to the LED light source over a predetermined output voltage and power range.

In yet another embodiment, the backup power supply further includes a PWM controller electrically coupled to gate voltage and drain current from the capacitor bank to the primary inductor winding of the flyback converter with a square wave signal having a frequency and pulse width. The frequency and pulse width of the square wave signal, and the design of the transformer are such that that primary inductor winding does not saturate during the application of the square wave signal.

In another embodiment, the backup power supply also has a smart output/no load resetting circuit electrically coupled to the secondary inductor and an output capacitor. The smart output/no load resetting circuit is configured to discharge the output capacitor through a resistive load in the event that the LED light source is decoupled from the backup power supply.

In another embodiment, the backup power supply is electrically interposed between an AC current source and the LED light source, and the backup power supply further includes an emergency LED driver and external AC LED driver switcher circuit that electrically couples the AC current source to the LED light source when the AC current source is in an ON condition, and which alternatively electrically couples the LED driver circuit to the LED light source when the AC current source is in an OFF condition.

In yet another embodiment, the backup power supply has an AC on delay circuit electrically interposed between said emergency LED driver and external AC LED driver switcher circuit and said LED light source. The AC on delay circuit is configured to supply a delay to the supply of AC current to the LED light source when the AC current source transitions from an OFF to an ON condition.

In one embodiment, the backup power supply further includes an AC input battery charger electrically coupled to an AC current source and a battery. The AC input battery charger is configured to charge said battery when said AC current source is in an ON condition.

In yet another embodiment, the backup power supply has a low battery drop circuit electrically coupled between the constant power LED driver circuit and the battery. The low battery drop circuit is adapted to sense an output voltage of the battery and disconnect the constant power LED driver circuit from the battery when the battery output voltage drops below a predetermined level.

Further embodiments of the invention include methods of providing components and circuits set forth in the preceding paragraphs.

In another embodiment, the invention includes a flyback converter for providing constant power to an LED load. The flyback converter is configured to supply sufficient DC current to maintain a predetermined constant output power over a range of between 20 and 50V.

In another embodiment, the flyback converter is designed for a predetermined constant output power is one of 5, 7 or 10 W.

Aspects of the invention have certain advantages over conventional systems. Embodiments of invention allow for constant power driving of arbitrary arrays of LEDs, within broad ranges of operating voltages, despite the specific operating voltage of a given driven array. This allows the same constant power backup system to be used on different types of LED lighting fixtures having different operating voltages. Embodiments of the invention are configured to deliver constant power over a lighting fixture operating range of from 20 to 48 VDC.

Embodiments of the invention are highly efficient, supplying up to 80% of input power to the LED lighting fixtures. Additionally, because output power, and therefore input power, is constant, the power drawdown from the backup batteries provided in the system is constant. This allows for batteries to be predictably drawn down to 10% of their stored power in the 90-minute backup period required by commercial standards, which in turn, allows for more efficient use of battery capacity.

Additionally, embodiments of the invention guard against dangerous conditions present when AC power is lost by the LED array and the backup source is connected, or vice versa. In particular, aspects of the invention use a "smart reset circuit" to overcome dangerously high voltage on the output of the backup system during open load conditions, prior to connection of the LED load. Additionally, the system is protected if the voltage load presented by the LED is out of specification.

Additionally, embodiments of the invention include a low battery shut down or battery drop circuit to protect the battery from over depletion and to guarantee constant output power within the operating voltage of the battery.

Additional advantages will become clear throughout the following detailed description of the preferred embodiments and in viewing the accompanying drawings.

BRIEF DESCRIPTION OF THE DRAWINGS

FIG. 1 is a circuit diagram of an exemplary constant power backup supply for LED lighting according to an embodiment of the invention.

DETAILED DESCRIPTION OF THE PREFERRED EMBODIMENT

This invention is described in preferred embodiments in the following description with reference to the Figures, in which like numbers or indications represent the same or similar elements. References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic circuit diagram showing a constant power backup supply for LED lighting according to an embodiment of the invention. In the embodiment of FIG. 1, the circuit of FIG. 1 is interposed between an AC power source, connected to connector H1, and an array of series connected LEDs (i.e., a lighting fixture described below as an LED load), connected to connector H2. The embodiment of the invention depicted in FIG. 1 involves the combination of 7 logically and physically separable sub-circuits, labeled Circuit 1 through Circuit 7 in FIG. 1 and interconnected as shown. While certain embodiments of the invention include each of Circuits 1 through 7, others do not, and inclusion of each of Circuits 1 through 7 in FIG. 1 should not be deemed a limitation on the invention.

In the embodiment of FIG. 1, Circuit 1 provides a universal AC input battery charger. As can be seen in FIG.

1, this functionality is provided by a flyback converter (comprising variable transformer T2 with taps as shown) operating in conjunction with non-illustrated AC power supply, PWM controller U1, and the illustrated passive components. As can be seen in FIG. 1, Circuit 1 comprises components H1, VR1, D1, C1, C2, R30, C7, U1, C4, C5, C13, R1, R2, D3, D2, R4, R17, C18, T2, C14, R15, D4, C15, C16, C17, R16 and F1. The flyback converter of FIG. 1 operates in discontinuous conducting mode, supplying continuous output current to non-illustrated batteries while AC power is supplied to the system, i.e., while AC power is in an ON condition. An exemplary PWM controller is the FSEZ1317NY Primary-side-regulation PWM with Power MOSFET available from Fairchild semiconductor.

In a particular embodiment, VR1 is an ESD protection diode, F1 is a 1A fuse, and D1 is a bridge rectifier. In the embodiment of FIG. 1, the capacitances of the capacitors of Circuit 1 are as follows: C2, C4 and C17 are 0.1 uF, C1 and C5 are 10 uF, C7 is 1 uF, C13 is 33 pF, C18 is 680 pF, C14 is 4700 pF, C15 is 1000 pF, and C16 is 100 uF. The resistances of the resistors in Circuit 1 in the embodiment of FIG. 1 are as follows: R30 is 100KΩ, R1 is variously 1.21Ω or 1.33Ω depending on designed for output power, R2 is variously 17.4 kΩ or 18.2 kΩ, R4 is 47.5KΩ, R17 is 200 KΩ, R15 is 47.5Ω, R16 is 20.0KΩ.

During the presence of Vac (108-304 Vac) the Universal AC Input Battery Charger circuit provides power (~37 Vdc across R16) to Circuit 2, the AC power on delay circuit, Circuit 3, the emergency LED driver and external AC LED driver switcher, and charges non-illustrated battery connected at BAT+ and BAT−. When no Vac is applied to Circuit 1, i.e., when AC power is in an OFF condition as occurs during a power failure, both Circuit 2, the AC power on delay circuit" and Circuit 3, the emergency LED driver and external AC LED driver switcher are turned off. Circuit 4, which is a capacitor bank and filter capacitor, Circuit 5, the low battery drop circuit, Circuit 6, the constant power LED driver, and Circuit 7, the smart output and no load resetting circuit, are supplied by non-illustrated battery connected at BAT+ and BAT− Battery (BAT+, BAT−) when no Vac is applied to Circuit 1, i.e., when AC power is in an OFF condition. The operation of these Circuits is set forth in greater detail below.

The embodiment of FIG. 1 also includes AC power on delay circuit, Circuit 2. As can be seen in FIG. 1, Circuit 2 comprises components R21, R20, C23, Q3, D10, D11 and K5. The function of AC power on delay circuit is to delay the reapplication of AC power to the external AC LED driver after a period of emergency backup power use, i.e., when the AC power input transitions from an OFF to an ON state. In particular, AC power on delay circuit, Circuit 2, controls the "Dly1" and "Dly2" which are neutral lines coupled to an external AC Driver. When power is present at Circuit 2, the current flows thru transistor Q3, thereby preventing relay K5 rom switching for a short period of time after reapplication of AC power. In one embodiment the length of the delay is approximately 2 seconds. As capacitor C23 (330 uF) charges, the voltage at the base of Q3 increases to where Q3 turns off allowing current flow thru relay K5 (PIN2, PIN5). Once K5 is energized it makes the contact between CON (PIN1) and NO (PIN3) after a brief delay. The magnitude of the delay can be controlled by selection of R20 and R21, which is one embodiment are respectively 49.9KΩ and 2.26KΩ resistors, and capacitor C23, which in one embodiment is 330 uF. When "Dly1" and Dly2" make contact, via K5, the external AC Driver is energized.

The embodiment of FIG. 3 also includes Circuit 3, which is the emergency LED driver and external AC LED driver switcher circuit. As can be seen in FIG. 1, Circuit 3 comprises components D12, R33, R3, K1, K2, K3 and H2. Circuit 3 selectably connects either the external AC power source (in the event of an AC ON condition), or constant power emergency LED driver (in the event of an AC OFF condition) to the LED array.

In particular, Circuit 3 controls the connection between the LED load and the non-illustrated battery. When power is applied to the coils of K1A, K2A, and K3A the contacts K1B, K2B, and K3B switch from CON-NC (PIN1-PIN4) to CON-NO (PIN1-PIN3). The positive and negative connections to the LOAD are controlled by K2B (positive) and K3B (negative). The load is connected, via H2, to CON (PIN1) of K2B and to CON (PIN1) of K3B. The external AC LED driver output (positive and negative) is connected to NO (PIN3) of K2B and to NO (PIN3) of K3B. The emergency LED driver (Circuit 6) is connected to NC (PIN4) of K2B and NC (PIN4) of K3B. During the time the coils K2A and K3A are energized the external AC LED driver powers the LOAD via K2B and K3B (PIN1-PIN3). When K2A and K2B are de-energized the LOAD is powered by the Emergency LED driver (Circuit 6) via K2B and K3B (PIN1-PIN4). The Battery (BAT+) is controlled by K1A. During the time the coil K1A is energized the connection between "GO1" and "GO2" is broken via K1B (PIN1-PIN3) allowing current from universal AC input battery charger (Circuit 1) to charge the battery. When K1A is de-energized the connection between "GO1" and "GO2" is made via K1B (PIN1-PIN4) allowing the battery to power the capacitor bank and filter capacitor (Circuit 4), low battery drop circuit (Circuit 5), constant power LED driver (Circuit 6) and smart output no load resetting circuit (Circuit 7), the operation of which are described in additional detail below.

The embodiment of FIG. 1 also includes Circuit 4, which is a capacitor bank electrically coupled to the non-illustrated battery. As can be seen in FIG. 1, Circuit 4 comprises components C9, C24, C25 and C12. The capacitor bank of Circuit 4 includes source capacitors C9, C24 and C25, which store charge to be discharged in driving the constant power LED driver, set forth in additional detail below. Capacitor C12 (0.1 uF) is a filter capacitor intended to filter high frequency noise from switching MOSFET transistor Q1 and Flyback transformer T1. In one embodiment, each of C9, C24 and C25 comprises 820 uF polymer capacitors selected to have low ESR ensuring their ability to supply maximum input current to the primary inductor for the transformer T1 in Circuit 6 without distortion. In particular, when battery voltage is applied to this Circuit 4 via "GO2" the capacitors C9, C24, C25, and C12 get charged ensuring source capacitors' ability to supply current up to the maximum peak current that can be driven through the primary coil of transformer T1 without distortion.

The embodiment of FIG. 1 also includes Circuit 5, which is a low battery drop circuit. As can be seen in FIG. 1, Circuit 5 comprises components R19, C11, R24, R23, R26, R25, D13, U3, R28, R22 and Q5. Circuit 5 is controlled by non-illustrated battery through connection to BAT+, BAT−. Circuit 5 monitors the battery voltage and controls the power going to the "constant power LED driver". When battery voltage is applied to this circuit via "GO2" the output of amplifier U3A goes "low" allowing transistor Q5 to turn on. When transistor Q5 is on, controller U2 is powered on allowing Circuit 6, the constant power LED driver to operate. When the battery voltage drops below 87.5% of nominal voltage the output of amplifier U3A goes "high" turning off Q5. When Q5 is off controller U2 is powered off, resulting in Circuit 6 being powered off. In one embodiment, the values of the passive components of Circuit 5 are as follows: R19 is 825Ω, C11 is 1 uF, R24 is 1.69KΩ, R23 is 1.78KΩ, R26 is 475Ω, R25 is 1.91KΩ, R28 is 10 KΩ and R22 is 3.57KΩ

The embodiment of FIG. 1 also includes Circuit 6, which is the constant power LED driver circuit. As can be seen from FIG. 1, Circuit 6 comprises components C20, C21, R10, R11, R6, R14, C22, R5, U2, R8, D5, D9, Q1, R9, R12, T1, D8, C19 and C10. The constant power LED driver circuit of Circuit 6 comprises a discontinuous conduction mode (DCM) flyback converter, which in turn comprises transformer T1. The primary winding inductance of T1 is selected to not limit the peak inductance current which the current saw wave remains linear. T1 includes a core material selected such that its flux density does not saturate within the designed constant power operating range, i.e., within the peak current range required to support the designed-for output power range. Variations in input power to the primary winding of T1 (created by, for example, variations in battery voltage) are controlled by adjusting the pulse width of the input signal driving T1 in conjunction with controller U2. The value of R11 is large enough to achieve a high gain while having a quick response to an output over voltage condition. The R14 value is selected to compensate for input voltage variation as a feed forward and R12 is provided in parallel with R9 to provide fine tuning for input power regulation. Resistors R10 and R6 limit the output voltage to 50V in the event that the load is disconnected. This is required by statutory and safety standards.

To operate in constant power, the flyback converter operates in discontinuous conducting mode in order to deliver all energy, which is stored in primary winding of transformer T1, to the secondary in each switching cycle. If the peak current of primary inductor is capped then the turn on time will increase, preventing discharge of all of the energy stored in the primary coil. In that scenario the converter becomes continuous conducting mode operating then in each switching cycle the energy transfer between primary and secondary does not complete.

Additionally, in the embodiment of FIG. 1, the primary side power is regulated without feedback from secondary, and the driving parameters are chosen to guarantee complete energy transfer from the primary winding of transformer T1 to the secondary. This guarantees that Circuit 6 operates in constant power. In particular, because the flyback converter of Circuit 6 operates in discontinuous mode, and as long as the primary input current to transformer T1 is limited to be below the peak current supportable by T1s primary inductor, Circuit 6 guarantees that the output power supplied to the LED load is dependent only on the peak inductor current (Ip), and is completely independent of voltage in and voltage out. This is a key feature of the invention: output power is independent of the Vout (i.e., the voltage associated with arbitrary LED loads), so long as the circuit can supply sufficient output current. Assuming no loses, Pin to Circuit 6=Pout=½*L*Ip^2, where L is 5.4 uH.

The design parameters of T1 are given by Faraday's law: Vin=4*n*Bm*Ac*fs and Lp=2*Vin^2/(Pin*fs), where n is the number of primary turns on the primary coil of T1, Vin is DC battery voltage (which in one embodying is in the range of 9-10V), Bm is flux density, Ac is core cross section, fs is switching frequency (of the input signal to T1), Pin is input power and Lp is primary inductance. In the embodiment of Circuit 6, sensing resistors R10 and R6 are for over-voltage protection only. In order to ensure that Circuit 6 operates in discontinuous conducting mode, the circuit is designed to run maximum peak current under an input DC battery voltage of 9.6V. In one embodiment, 5 turns are used for the primary of T1, and three 820 uF bulk capacitors are used on the input side to guarantee the ability of Circuit 6 to supply between 5 W and 10 W of output power for any output voltage up to 50V. If input battery voltage change and output power change we need change transformer winding turns and capacitor's value accordingly.

Applicant has produced 3 prototype constant power LED drivers according to the embodiment of FIG. 1: a 5 W, a 7 W and a 10 W prototype, each of which is operational over a Vout range of approximately 20-50V. For the 5 W prototype, the values of the passive components of the circuit of FIG. 1 are as follows: R2 is 17.4 KΩ, R9 is 1.21Ω, R12 is 0.250Ω and R1=1.33Ω. For the 7 W prototype the values of the passive components of Circuit 6 are as follows: R2 is 18.2 KΩ, R9 is 1.78Ω, R3 and R33 are 715Ω, R12 is 0.180Ω and R1=1.21Ω. For the 10 W prototype the values of the passive components of Circuit 6 are as follows: R2 is 18.2 KΩ, R9 is 3.24Ω, R3 and R33 are 715Ω, R12 is 0.150Ω and R1=1.21Ω. The values of the passive component of Circuit 6 that are common for all designed-for power levels are as follows: R10 is 38.3 KΩ, R11 is 1.0 MΩ, R6 is 2.00KΩ, R5 is 10 KΩ, R8 is 1.00 KΩ, C20 is 0.1 uF, C21 is 33 pF, C22 is 1000 pF, C19 is 0.1 uF and C10 is 56 uF.

The embodiment of FIG. 1 further includes Circuit 7, which provides fault protection, specifically, a smart output/no load resetting circuit. As can be seen in FIG. 1, Circuit 7 includes components R29, Q6, DZ1, R31, R32 and DZ2. This portion of the circuit of FIG. 1 is controlled by non-illustrated battery connected to the circuit of FIG. 1 through terminals BAT+, BAT−. Circuit 7 drains/discharges the capacitor bank of Circuit 4, as well as C19 and C10 on Circuit 6, which protects the LED load if it is disconnected and reconnected during operation of the constant power LED driver circuit of Circuit 6. In particular, when battery voltage is present via "GO2" the Gate of transistor Q6 has this voltage present. The gate voltage of Q6 is reverse biased compared to the 12V of DZ1 on the source of Q6. As a result, in this condition, Q6 is off and resistor R29 (2K Ohm) is disconnected from output of the constant power LED driver of Circuit 6 to avoid resistor R29 draining battery power in emergency operation (i.e., in an AC power OFF condition).

Another function of Circuit 7 is to reset the voltage on C10 such that it drops to less than 20V within 0.3 seconds of the LED load being disconnected from the driver. In particular, when both the LED load and battery power are disconnected, charge remains stored in bulk capacitors C9, C24 and C25 while the constant power LED driver circuit remains running, which causes the voltage on C10 to increase to 50V. However, when the Vgs of Q6 becomes forward biased by the absence of battery voltage on the gate of Q6, Q6 is on and R29 is connected to the output of the constant power LED driver. The charge in C10 is then quickly discharged through R29 to be below 20V.

Thus, according to the design described above, when the DC battery presents its voltage, the resetting circuit is disconnected from the output circuit by Q6 to prevent power loss. When the LED load switches back to connect the driver, the inrush LED current is limited to prevent damaging the LED load.

The invention has been described with respect to particular embodiments. Those having skill in the art will recognize that additional embodiments will be within the scope of the invention. The invention is not limited by the description of particular embodiments, but instead, is defined in accordance with the following claims.

The invention claimed is:

1. A power supply for driving an LED light source, the supply comprising:
    a power source adapted to provide DC electrical current;
    a constant power LED driver circuit comprising a flyback converter comprising a transformer having a primary inductor winding that is electrically coupled to the power source, and a secondary inductor winding that is selectably electrically coupled to the LED light source;
    further comprising one or more capacitors electrically interposed between the primary inductor winding and the power source, the one or more capacitors having a capacitance sufficient to supply sufficient current to the primary inductor winding to supply constant power to the LED light source over a predetermined output voltage and power range
    wherein the power supply is electrically interposed between an AC current source and the LED light source, and wherein the power supply further comprises an emergency LED driver and external AC LED driver switcher circuit that electrically couples the AC current source to the LED light source when the AC current source is in an ON condition, and which alternatively electrically couples the LED driver circuit to the LED light source when the AC current source is in an OFF condition.

2. The power supply of claim 1, wherein the flyback converter further comprises a PWM controller.

3. The power supply of claim 2, wherein the PWM controller is electrically coupled to gate voltage and drain current from the one or more capacitors to the primary inductor winding of the flyback converter with a square wave signal.

4. The power supply of claim 3, wherein the square wave signal has a frequency and a pulse width, and wherein the frequency and pulse width of the square wave signal, and the design of the transformer are such that that primary inductor winding does not saturate during the application of the square wave signal.

5. The power supply of claim 1, wherein the transformer is configured to operate in discontinuous conduction mode.

6. The power supply of claim 1, further comprising one or more output capacitors electrically coupled between a secondary inductor winding of the transformer and the LED light source.

7. The power supply of claim 6, further comprising a resistive load coupled to the one or more output capacitors.

8. The power supply of claim 7, further comprising a smart output/no load resetting circuit electrically coupled to the secondary inductor and the output capacitor, wherein the smart output/no load resetting circuit is configured to discharge the output capacitor through the resistive load in the event that the LED light source is decoupled from the backup power supply.

9. The power supply of claim 1, further comprising an AC on delay circuit electrically interposed between said emergency LED driver and external AC LED driver switcher circuit and said LED light source, wherein said AC on delay circuit is configured to supply a delay to the supply of AC current to the LED light source when the AC current source transitions from an OFF to an ON condition.

10. The power supply of claim 1, wherein the power source is a battery, and further comprising an AC input battery charger electrically coupled to an AC current source and said battery, wherein the AC input battery charger is configured to charge said battery when said AC current source is in an ON condition.

11. The power supply of claim 10, further comprising a low battery drop circuit electrically coupled between the constant power LED driver circuit and the battery, wherein the low battery drop circuit is adapted to sense an output voltage of the battery and disconnect said constant power LED driver circuit from the battery when the battery output voltage drops below a predetermined level.

12. A method of providing power to an LED light source, the method comprising:
    providing a power source adapted to provide DC electrical current; and
    providing a constant power LED driver circuit comprising a flyback converter
    comprising a transformer, wherein
    the flyback converter has a primary inductor winding that is electrically coupled to the storage power source, and
    the flyback converter has a secondary inductor winding that is selectably electrically coupled to the LED light source; and
    further comprising providing one or more capacitors electrically interposed between the primary inductor winding and the power source, the one or more capacitors having a capacitance sufficient to supply sufficient current to the primary inductor winding to supply constant power to the LED light source over a predetermined output voltage and power range.

13. The method of claim 12, further comprising providing a voltage and current from the one or more capacitors to the primary inductor winding of the flyback converter.

14. The method of claim 13, wherein the voltage and current are provided to the primary inductor winding of the flyback converter as an AC signal having a frequency and pulse width, and wherein the frequency and pulse width of the square wave signal, and the design of the transformer are such that that primary inductor winding does not saturate during the provision of the square wave signal.

15. The method of claim 12, wherein the predetermined output voltage comprises a predetermined output voltage range.

16. The method of claim 15, wherein the predetermined output voltage range is up to 50V.

17. The method of claim 12, wherein the predetermined constant output power is in the range of between about 5 and 10 W.

18. The method of claim 12, further comprising operating the flyback converter in discontinuous conduction mode.

* * * * *